2,833,770
SUBSTITUTED PIPERAZINES AND METHODS FOR OBTAINING THE SAME

Robert F. Parcell, Detroit, Mich., assignor to Parke, Davis & Company, Detroit, Mich., a corporation of Michigan No Drawing. Application June 25, 1956
Serial No. 593,377

10 Claims. (Cl. 260—268)

This invention relates to substituted phenylpiperazines and to methods for obtaining the same. More particularly, the invention relates to N-o-halophenyl-N'-alkylated piperazines and acid salts thereof. These compounds, in their free base form, have the formula

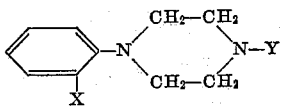

where X is a chlorine or bromine radical and Y is a methyl group or a straight chain alkylene group containing 2 to 5 carbon atoms inclusive substituted on the omega-carbon atom thereof by a hydrogen, hydroxyl, —NH—COH, or —NH—CO (lower alkyl) radical. The free base of the N-o-halophenyl-N'-alkylated piperazines form well defined salts upon reaction with acids such as hydrochloric, hydrobromic, sulfuric, phosphoric, hydriodic and the like acids.

In accordance with the invention N-o-halophenyl-N'-alkylated piperazines having the above formula can be produced in a number of different ways. One general method for preparing these compounds involves reacting N-o-halophenyl-piperazine with a halide alkylating agent of formula, $$\text{Hal—Y}$$

when Hal is a halogen atom and Y has the same significance as given above. In the case where Y is an alkyl radical the corresponding dialkylsulfates or alkyl p-toluene sulfonates can be substituted for the alkyl halides in the process. In carrying out the process it is preferable to employ about two equivalent of the N-o-halophenylpiperazine to each equivalent of the halide alkylating agent and to use an anhydrous organic solvent such as benzene, toluene, xylene, ether and the like. The temperature of the reaction is not particularly critical and can be varied from room temperature to about 175° C. The reaction is conveniently carried out at reflux temperature in the presence of solvent having a boiling point below that of the alkylating agent employed.

Another method by which the compound wherein Y is a methyl group can be prepared comprises reacting N-o-halophenylpiperazine with formaldehyde in the presence of formic acid.

A method which is particularly useful in the preparation of the products wherein Y is substituted with a lower aliphatic acylamido group comprises reacting N-o-halophenylpiperazine with an ω-haloalkyl nitrile to obtain the corresponding N-o-halophenyl-N'-ω-cyanoalkyl piperazine, reducing the cyano group to a primary amino group and reacting the N-o-halophenyl-N'-ω-amino-alkyl piperazine with a lower aliphatic acyl halide or anhydride. The first step of this process is carried out in the same manner as described above for the reaction of the halide alkylating agent, Hal-Y, with N-o-halophenylpiperazine. The reduction of the cyano group to the amino group can be carried out in a number of different ways but it is preferably performed catalytically using gaseous hydrogen and a noble metal catalyst such as platinum oxide or chemically using lithium aluminum hydride. If desired, the N-o-halophenyl-N'-ω-aminoalkylpiperazine can be isolated at this point and then acylated with an acyl halide or anhydride. However, the simplest method for producing the desired products involves combining the reduction and acylation steps of the process. This can be accomplished by carrying out the reduction using gaseous hydrogen and a noble metal catalyst in a solution composed of a mixture of the lower fatty acid and anhydride corresponding to the acyl group desired in the final product. For example, where the acyl group desired in the final product is the acetyl group, the reduction is carried out in a solvent composed of acetic acid and acetic anhydride.

A special method which can be used in the preparation of the products wherein Y is a trimethylene group substituted with a lower aliphatic acylamido group comprises reacting N-o-halophenylpiperazine with acrylonitrile to obtain N-o-halophenyl - N' - (2 - cyanoethyl)piperazine which can then be subjected to reduction and acylation as described above. In carrying out the reaction between the acrylonitrile and N-o-halophenylpiperazine it is satisfactory to employ an anhydrous organic solvent such as benzene, toluene or xylene and to heat the reaction mixture at refluxing temperature. The reaction can be carried out in the absence of solvent without application of external heat.

A special method which can be used to prepare N-o-halophenyl - N' - (3-hydroxypropyl)piperazine comprises reacting N-o-halophenylpiperazine with allyl alcohol in the presence of an alkali metal alcoholate of allyl alcohol. The reaction is preferably carried out at the boiling point of the mixture and in the absence of any solvent other than allyl alcohol.

The N-o-halophenyl-N'-alkylated piperazines of the invention and their acid salts are powerful sympatholytic agents and because of this ability to block the pressor effect of epinephrine they are especially useful in the treatment of peripheral vascular diseases and neurogenic hypertension. The following table shows the results obtained when representative examples of the products of the invention are tested in dogs by the standard procedure for detecting and measuring sympatholytic activity.

TABLE

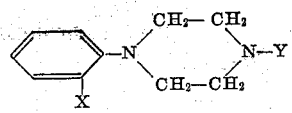

| Compound | | Dose in mg./kg. required for complete reversal of pressor response of 2 gamma of epinephrine |
|---|---|---|
| X | Y | |
| —Cl | —CH₃ | 2 |
| —Cl | —CH₂CH₂CH₂CH₃ | 1 |
| —Cl | —CH₂CH₂CH₂OH | 1.25 |
| —Cl | —CH₂CH₂CH₂CH₂OH | 1 |
| —Br | —CH₂CH₂CH₂CH₂CH₂OH | 0.25 |
| —Cl | —CH₂CH₂CH₂NH—COCH₃ | 0.3 |
| —Cl | —CH₂CH₂CH₂CH₂CH₂NH—COH | 1–2 |

The invention is illustrated by the following examples:

Example 1

63.8 g. of o-chloroaniline and 52.6 g. of diethanolamine are placed in a flask and the mixture slowly neutralized with concentrated hydrochloric acid (sp. g. 1.18). The reaction mixture is heated slowly to 220° C. and held at this temperature for 3 to 5 hours. The reaction mixture is cooled and the brown solid which remains made basic with 80–85 g. NaOH in 250 ml. water. The mixture is cooled, extracted with ether and the ether solution dried over solid anhydrous potassium carbonate. The ether is removed by distillation and the residue subjected to a vacuum distillation. The product which distills at 123–124° at 2 mm. of mercury is collected. This product is N-o-chlorophenylpiperazine of formula,

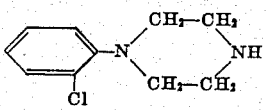

A mixture consisting of 39.3 g. of N-o-chlorophenylpiperazine and 37 g. of formic acid is warmed on a steam bath and a slight excess (18 ml.) of a 37% aqueous solution of formaldehyde is added over a period of one hour with stirring. The reaction mixture is heated for another hour on a steam bath and the solvents removed by distillation under reduced pressure. The residue is dissolved in water, the solution made basic (pH 12–14) with alkali and extracted with 250 ml. of benzene. The benzene solution is dried over anhydrous potassium carbonate and the solvent is removed by distillation. The residue which consists of N-o-chlorophenyl-N'-methylpiperazine is dissolved in anhydrous ether and treated with an excess of anhydrous hydrogen chloride. The precipitate is collected and recrystallized twice from a mixture of methanol and ether; M. P. 264–265° C. with decomposition. This product is N-o-chlorophenyl-N'-methylpiperazine monohydrochloride of formula,

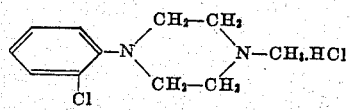

Example 2

A solution of 98 g. of N-o-chlorophenylpiperazine and 38 g. of n-amyl bromide in 250 ml. of benzene is refluxed for sixteen hours, the reaction mixture filtered to remove the N-o-chlorophenylpiperazine hydrobromide and the benzene evaporated from the filtrate. The residue containing the desired N-o-chlorophenyl-N'-n-amylpiperazine is dissolved in isopropanol and the solution treated with an excess of anhydrous hydrogen chloride. The mixture is cooled, and the precipitate collected and recrystallized from a mixture of methanol and ether; M. P. 222–224° C. The product so obtained is N-o-chlorophenyl-N'-n-amylpiperazine monohydrochloride which has the formula

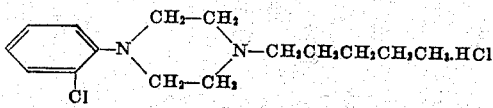

Example 3

25 g. of N-o-chlorophenylpiperazine is added to a solution of 3.5 g. of metallic sodium in 125 ml. of allyl alcohol and the resulting mixture heated under reflux for ninety hours. The excess allyl alcohol is removed by distillation in vacuo and the residue extracted with benzene. The benzene extracts are dried over potassium carbonate, filtered and the benzene distilled from the filtrate. The residue is triturated several times with petroleum ether and then recrystallized twice from a mixture of benzene and petroleum ether. The product so obtained is N-o-chlorophenyl-N'-(3-hydroxypropyl)-piperazine (M. P. 96–98° C.) which has the formula

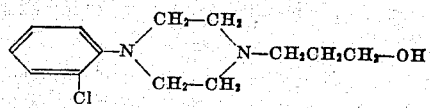

Example 4

A solution consisting of 78.6 g. of N-o-chlorophenylpiperazine, 24.6 g. of pentamethylene chlorohydrin and 250 ml. of toluene is refluxed with stirring for eighteen hours. The reaction mixture is filtered to remove the N-o-chlorophenyl piperazine hydrochloride and the filtrate containing the desired N-o-chlorophenyl-N'-(5-hydroxyamyl)piperazine diluted with an equal volume of absolute alcohol. The solution is treated with an excess of anhydrous hydrogen chloride, the mixture cooled and the precipitate collected. N-o-chlorophenyl-N'-(5-hydroxyamyl)piperazine monohydrochloride so obtained is purified by recrystallization from methanol-ether mixture; M. P. 167–168° C. The formula of this compound is

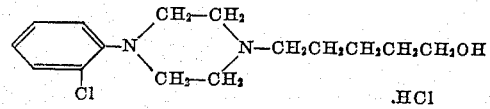

The free base of N-o-chlorophenyl-N'-(5-hydroxyamyl)piperazine can be prepared by dissolving the monohydrochloride salt in water, making the solution alkaline with sodium carbonate and extracting the product with benzene. The benzene is distilled from the extract and the residue purified by recrystallization from benzene-petroleum ether mixture.

Example 5

50 g. of N-o-chlorophenylpiperazine is dissolved in 100 ml. of acrylonitrile and the resulting solution refluxed for twenty hours. The excess acrylonitrile is removed by distillation, the residue dissolved in benzene (250 ml.) and the benzene solution filtered. The benzene is removed by distillation from the filtrate and the residue triturated with petroleum ether. Recrystallization from a mixture of benzene and petroleum ether, yields the desired N-o-chlorophenyl-N'-(2-cyanoethyl)piperazine; M. P. 42–45° C. The formula of this product is

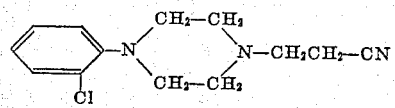

25 g. of N-o-chlorophenyl-N'-(2-cyanoethyl)-piperazine is dissolved in a mixture consisting of 30 ml. of glacial acetic acid and 200 ml. of acetic anhydride. The solution is hydrogenated at 60° C. using 0.1 g. of platinum oxide catalyst and hydrogen at 60 pounds per square inch pressure. When the theoretical amount of hydrogen is adsorbed, the solution is filtered to remove the catalyst and the acetic acid and acetic anhydride removed by distillation in vacuo. The residue is dissolved in water, treated with sodium bicarbonate until carbon dioxide is no longer evolved and extracted with 250 ml. of benzene. The benzene extracts are dried, charcoaled and filtered. The filtrate is concentrated to about 75 ml., diluted with petroleum ether and the mixture cooled. The precipitate which separates from the solution is collected and recrystallized from a mixture of benzene and petroleum ether to obtain the desired N-o-chlorophenyl-N'-(3-acetamidopropyl)piperazine in pure form; M. P. 95–96° C. The formula of this compound is

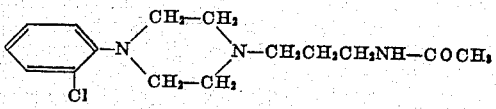

Example 6

A solution consisting of 98 g. of N-o-chlorophenylpiperazine and 40.5 of δ-bromovaleronitrile and 250 ml. of benzene is refluxed with stirring for several hours, the reaction mixture filtered to remove the N-o-chlorophenylpiperazine hydrobromide and the filtrate concentrated on a steam bath to a volume of about 100 ml. The solution is diluted with petroleum ether and the yellow oil which separates collected and dissolved in 200 ml. of dry benzene. The solution containing the desired N-o-chlorophenyl-N'-4-cyanobutylpiperazine is added slowly to a stirred solution of 20 g. of lithium aluminum hydride in one liter of anhydrous ether. When the addition is complete, 21 ml. of water, then 16 ml. of 20% aqueous sodium hydroxide and finally 74 ml. of water are added. The solution is filtered, the filtrate dried, and the solvent is removed by distillation under reduced pressure. The residue is subjected to vacuum distillation to obtain the desired N-o-chlorophenyl-N'-(5-aminoamyl)piperazine; B. P. 160–165° C. at 0.4 mm. of mercury. The formula of this compound is

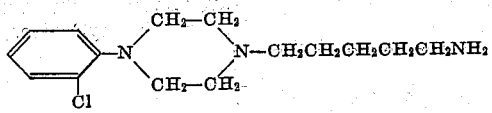

A mixture of 37 g. of N-o-chlorophenyl-N'-(5-aminoamyl)piperazine, 20 g. of formic acid and 200 ml. of xylene is heated under reflux with stirring while distilling off a small portion of the reaction mixture. When no further water is detected in the distillate (about six hours) the xylene solution is cooled. The solution is washed with dilute sodium carbonate, then with water and finally concentrated to a volume of about 75 ml. by vacuum distillation. The residue is diluted with 5 volumes of petroleum ether, the oil which separates removed and triturated with petroleum ether until crystallization occurs. The product is recrystallized from a mixture of ether and petroleum ether to obtain the desired N-o-chlorophenyl-N'-(5-formamidoamyl)piperazine (M. P. 47–49° C.). This compound has the formula

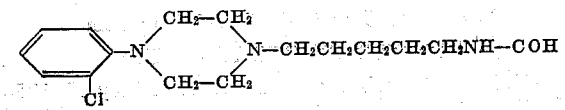

Example 7

A mixture of 48.2 g. of N-o-bromophenylpiperazine, 21 g. of 5-bromopentanol-1 acetate ester and 200 ml. of benzene is stirred and heated at reflux temperature for 16 hours. The reaction mixture is cooled, diluted with ether to a total volume of one liter, stirred and filtered. The solvent is taken off by evaporation and the residue is taken up in 500 ml. of methanol. Two grams of sodium methoxide is added, the solvent is taken off by distillation, and the residue is diluted to 500 ml. with ether. The ethereal solution is washed three times with 200 ml. of water and dried over magnesium sulfate. The solvent is taken off by distillation, an excess of isopropanolic hydrogen chloride is mixed with the residue, and ether is added to cause separation of a precipitate. The precipitate, N-o-bromophenyl-N'-(5-hydroxyamyl)piperazine, monohydrochloride, is removed and recrystallized from a mixture of isopropanol and ether; M. P. 185–186° C. This product has the formula

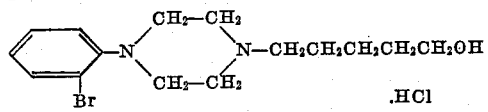

The starting materials employed can be prepared in the following manner.

N-o-bromophenylpiperazine.—A mixture of 188 g. of o-bromoaniline, 170 g. of bis(β-bromoethyl) amine hydrochloride and 500 ml. of butanol are refluxed for 17 hours with stirring. Anhydrous sodium carbonate (58 g.) is added with stirring and the butanol is removed by steam distillation. One liter of water is added, the mixture is neutralized by addition of dilute hydrochloric acid and extracted with ether. The aqueous layer is made strongly basic with 40% sodium hydroxide solution and is extracted with ether. The latter ether extracts are washed first with water and then with 100 ml. of 40% sodium hydroxide. The ether is removed by evaporation or a steam bath and the residue is distilled under vacuum. The fraction boiling at 109–113° C. (0.35 mm.) is N-o-bromophenylpiperazine.

5-bromopentanol-1-acetate.— Granulated zinc (2 grams) is added to 140 g. of acetyl bromide containing traces of hydrogen bromide and the mixture is stirred and warmed gently for 20 minutes. 86 grams of tetrahydropyran is added, and the mixture is stirred for two hours at 60–70° C. with cooling as required. The temperature is then increased to 90–100° C. and maintained for 30 minutes. The reaction mixture is distilled under reduced pressure to provide an almost quantitative yield of 5-bromopentanol-1-acetate; B. P. 109–111° C. (14 mm. mercury).

Example 8

A mixture of 38 g. of N-o-bromophenylpiperazine and 24.2 g. of acrylonitrile is heated on a steam bath for 4 hours. The excess acrylonitrile is removed under reduced pressure, the residue dissolved in benzene and filtered. The filtrate is concentrated to approximately 75 ml., diluted with petroleum ether and chilled. The resulting white crystals are removed and washed well with petroleum ether. The product, N-o-bromophenyl-N'-(2-cyanoethyl)-piperazine (M. P. 57–59° C.), has the formula

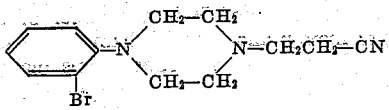

A solution of 41 g. of N-o-bromophenyl-N'-(2-cyanoethyl)-piperazine in 500 ml. of absolute ether is added as rapidly as possible to a solution of 5.3 g. of lithium aluminum hydride in 500 ml. of absolute ether. The resulting mixture is stirred for 20 minutes and 10 ml. of water is added with caution to decompose the complex and excess lithium aluminum hydride. Stirring is continued for one-half hour to insure the completion of decomposition. 400 ml. of 20% sodium hydroxide is added rapidly and stirred thoroughly and the resulting layers are separated by decantation. The ether layer is dried over solid sodium hydroxide and ether removed by evaporation on a steam bath. The residual product, N-o-bromophenyl-N'-(3-aminopropyl)-piperazine, has the formula

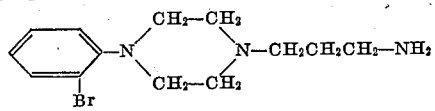

The residual product is dissolved in a mixture of 75 ml. of glacial acetic acid and 30 ml. of acetic anhydride. The resulting solution is refluxed for 2 hours and the excess acetic anhydride and acetic acid are removed by distillation in vacuo. The residue is poured into an excess of sodium carbonate solution and extracted twice with benzene. The combined extracts are dried and concentrated to about 125 ml. and diluted with petroleum ether. The product, which separates, is isolated by filtration and is recrystallized from a mixture of benzene and petroleum ether; M. P. 113–115° C. The product, N-o-bromophenyl-N'-(3-acetamidopropyl)piperazine, has the formula

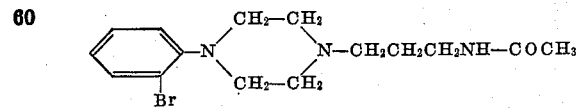

Example 9

A mixture of 24 grams of N-o-bromophenylpiperazine and 9 ml. of methyl acrylate is allowed to stand for 16 to 18 hours at 23–25° C. and is then dissolved in ether. The ether solution is added to a stirred slurry of 5 g. of lithium aluminum hydride in 700 ml. of ether. The reaction mixture is stirred for one-half hour and the complex decomposed by the cautious addition of an excess of aqueous sodium hydroxide. The ether layer is removed by decantation, dried over anhydrous magnesium sulfate and filtered. The ether is removed by distillation and the residue triturated with low boiling petroleum ether until crystallization occurs. The product, N-o-bromophenyl-N'-(3-hydroxypropyl)-piperazine, is removed by filtration and recrystallized from a mixture of ether and low boiling petroleum ether. The product has the formula

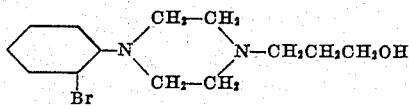

This application is a continuation-in-part of my co-pending application Serial No. 381,747, filed September 22, 1953, now abandoned.

I claim:
1. A compound of the class consisting of a free base and its acid salts, said free base having the formula

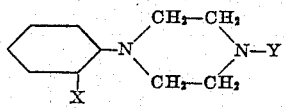

where X is a member of the group consisting of chlorine and bromine radicals and Y is a member of the group consisting of methyl and straight chain omega-substituted alkylene containing 2 to 5 carbon atoms inclusive, said alkylene being substituted at the omega-carbon atom by a member of the group consisting of hydrogen, hydroxyl, —NH—COH, and —NH—CO (lower alkyl) radicals.

2. A compound of formula

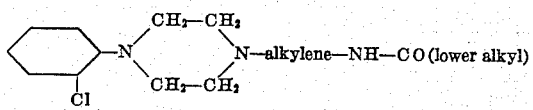

said alkylene being a straight chain of 2 to 5 carbon atoms inclusive.

3. N-o-chlorophenyl-N'-(3-acetamidopropyl)piperazine.

4. A compound of formula

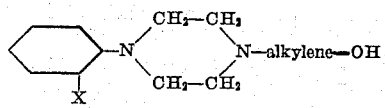

said alkylene being a straight chain of 2 to 5 carbon atoms inclusive and being a member of the group consisting of chlorine and bromine.

5. N-o-chlorophenyl-N'-(5-hydroxyamyl)piperazine.
6. N-o-chlorophenyl-N'-(3-hydroxylpropyl)-piperazine.
7. A compound of formula

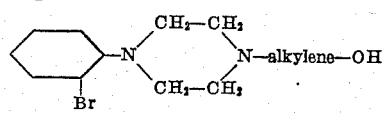

said alkylene being a straight chain of 2 to 5 carbon atoms inclusive.

8. N-o-bromophenyl-N'-(5-hydroxyamyl)piperazine.
9. A compound of formula

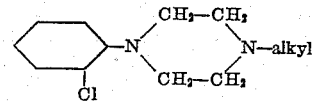

said alkyl being a straight chain of 1 to 5 carbon atoms inclusive.

10. N-o-chlorophenyl-N'-n-amylpiperazine.

References Cited in the file of this patent
UNITED STATES PATENTS

| | | |
|---|---|---|
| 2,679,481 | Norris et al. | May 25, 1954 |
| 2,722,529 | Fleming et al. | Nov. 1, 1955 |

FOREIGN PATENTS

| | | |
|---|---|---|
| 162,905 | Australia | May 17, 1955 |
| 656,588 | Great Britain | Nov. 2, 1948 |